US012579445B2

(12) United States Patent
Barrett et al.

(10) Patent No.: US 12,579,445 B2
(45) Date of Patent: Mar. 17, 2026

(54) MODELS FOR PREDICTING RESISTANCE TRENDS

(71) Applicant: Mobiltex Data Ltd., Calgary (CA)

(72) Inventors: Matthew Albert Barrett, Calgary (CA); Antonio Laranjo da Costa, Calgary (CA); William Philip Maize, Calgary (CA)

(73) Assignee: Mobiltex Data Ltd., Alberta (CA)

( * ) Notice: Subject to any disclaimer, the term of this patent is extended or adjusted under 35 U.S.C. 154(b) by 738 days.

(21) Appl. No.: 17/684,752

(22) Filed: Mar. 2, 2022

(65) Prior Publication Data

US 2023/0281471 A1      Sep. 7, 2023

(51) Int. Cl.
G06N 5/022          (2023.01)
G06N 5/04            (2023.01)

(52) U.S. Cl.
CPC .............. G06N 5/022 (2013.01); G06N 5/04 (2013.01)

(58) Field of Classification Search
CPC .......... G06N 5/04; G06N 5/022; G06N 3/065; G06F 30/30; G06F 7/5443; G06F 2207/4814; G06F 1/1601; G06F 1/3209; G06F 21/32; G06F 21/35; G06F 21/64; G06F 2200/1611; G06F 2200/1612; G06F 3/0238; G06F 3/0362; G06F 3/0421; G06F 3/0433
USPC .......................................................... 706/12
See application file for complete search history.

(56) References Cited

U.S. PATENT DOCUMENTS

| | | | | |
|---|---|---|---|---|
| 11,861,752 B2 * | 1/2024 | Kantorovich | ..... | G06F 18/24323 |
| 2021/0018881 A1 | 1/2021 | Rezgui et al. | | |
| 2023/0014791 A1 * | 1/2023 | Tinnea | ................. | G01N 17/02 |
| 2023/0071833 A1 * | 3/2023 | Chen | ..................... | G07C 5/008 |
| 2023/0141890 A1 * | 5/2023 | Furman | ............... | H04B 17/373 |
| | | | | 370/340 |

FOREIGN PATENT DOCUMENTS

| | | | | |
|---|---|---|---|---|
| CN | 112508429 A | * | 3/2021 | |
| CN | 113761212 A | * | 12/2021 | ....... G06F 16/24564 |

OTHER PUBLICATIONS

Al-Shareefi, Hussein Kadhim Mohammed (2009), Neural Network Corrosion Control by Impressed Cathodic Protection, (M.S. Mech. Eng. Project, Reg No. E 3778 M) (Year: 2009).*

(Continued)

*Primary Examiner* — Luis A Sitiriche
(74) *Attorney, Agent, or Firm* — Hartman Global IP Law; Gary M. Hartman; Domenica N.S. Hartman

(57) ABSTRACT

A computer-implemented method of training a classification model includes the steps of obtaining, by at least one computer, a plurality of historical resistance trends from a plurality of installed rectifier sites and rectifier site metadata for each installed rectifier site of the plurality of installed rectifier sites; labelling each historical resistance trend of the plurality of historical resistance trends as one of a plurality of historic resistance trend classifications; and, inputting into a machine learning algorithm the historical resistance trends and the rectifier site metadata of the plurality of installed rectifier sites to train the classification model to output a predicted resistance trend classification in response to rectifier site metadata input into the model.

25 Claims, 14 Drawing Sheets

(56) References Cited

OTHER PUBLICATIONS

Androvitsaneas, et al. (Nov. 2016), Wavelet Neural Network Methodology for Ground Resistance Estimation, doi:10.1016/j.epsr.2016.06.013 (Year: 2016) (Year: 2016).*

Rossouw, et al. (Sep. 14, 2021), Predictive Maintenance Framework for Cathodic Protection Systems Using Data, doi:10.3390 (Year: 2021) (Year: 2021).*

Langelund, Eris S. (2013) "Rectifier Maintenance: How I Spent My Summer Vacation" Department of Defense Virtual Corrosion Conference 2013 (Year: 2013).*

TankSmart (N.D.), "Cathodic Protection for Tanks & Piping" Module 21 (Year: 2014).*

Lewis, T.H. Jr., (2000), "Deep Anode Systems—Design, Installation, and Operation," 978-1-57590-111-4 (Year: 2002).*

NACE, "Standard Recommended Practice Control of External Corrosion on Underground or Submerged Metallic Piping Systems," (Apr. 11, 2002) NACE RP0169-2002 (Year: 2002).*

Office Action for Australian Patent Application No. 2023201188 dated Sep. 24, 2024; 4 pages.

Castaneda, H. et al., "Detecting External Failures in Coated, Buried Pipelines: Theoretical Model and Experimental Verification", 2004, NACE International—Corrosion Science Section, pp. 538-547.

Rossouw, E. et al., "Predictive Maintenance Framework for Cathodic Protection Systems Using Data Analytics", Energies (2021), 14, 5805, pp. 1-23.

International Search Report and Written Opinion, for International Application No. PCT/CA/2023/050229, dated Mar. 27, 2023, 7 pages.

Androvitsaneas, V.P. et al., "Ground Resistance Estimation Using Inductive Machine Learning", The 19th International Symposium on High Voltage Engineering, Pilsen, Czech Republic, Aug. 23-28, 2015; (7 pages).

Androvitsaneas, V.P. et al., Wavelet Neural Network for Ground Resistance Estimation, Proc. of 5th Int. Conf. High Voltage Eng. & Appl. (ICHVE), Poznan, Poland, Sep. 8-11, 2014; (6 pages).

Androvitsaneas, V.P. et al., Artificial Neural Network Methodology for the Estimation of Ground Enhancing Compounds Resistance, IET Sci. Meas. Technol., vol. 8, No. 6, (pp. 552-570), Nov. 2014.

Examination Report, dated Sep. 29, 2023 for Application No. 2023201188 (7 pages).

* cited by examiner

MODELS FOR PREDICTING RESISTANCE TRENDS

TECHNICAL FIELD

The present disclosure relates to the training and implementation of one or more classification models for predicting resistance trends in soil. More particularly, the present disclosure relates to the training and implementation of one or more machine learning models for predicting resistance trends in ground beds for pipeline cathodic protection systems.

BACKGROUND

Metallic objects embedded in electrolytic media are generally subject to corrosion. Corrosion is a natural process which converts a refined metal into a more chemically stable form such as oxide, hydroxide, or sulfide. Corrosion is a deterioration and destruction of the material making up the metallic object and is caused by electrochemical reactions between the material making up the metallic object and its electrolytic media environment. Moisture, material composition, pH, temperature, and polarization are some of the factors which may influence the rate of corrosion of the metallic structure.

Metallic objects such as pipelines embedded in electrolytic media, such as soil, are subject to corrosive electrochemical forces. Pipeline corrosion can result in damage, which is costly to repair, and which is potentially hazardous to the operation of the pipeline itself. Corroded pipelines can be subject to failure or contamination which can result in release of potentially hazardous materials into the natural environment.

One method for protecting against pipeline corrosion includes use of cathodic protection rectifiers, each physically connected to the pipeline, and one or more anodes. Each rectifier protects a section of the pipeline from corrosive activity. In the cathodic protections system, rectifiers are positioned along the length of the pipeline to protect long sections of the pipeline, and preferably the entire pipeline, from corrosive activity.

Impressed current rectifiers are a useful cathodic protection solution for protecting pipelines from corrosion. Impressed current rectifiers are a source of current external to the pipeline. The rectifier is connected to the pipeline and one or more anodes. The rectifier distributes protective current to the pipeline and drives corrosion to the anodes.

Rectifiers may be used to protect a large length of electrically continuous pipeline and are advantageous when compared to galvanic cathodic protection systems as they have a reduced material cost and are generally more efficient. However, like galvanic anodes, impressed current anodes are a consumable asset and require replacement at the end of their service life to ensure that a rectifier can continue to adequately protect the pipeline.

Anodes are typically positioned near the pipeline in a ground bed. The ground bed provides a low-resistance path to ground for the protective current leaving the anodes. Ground bed resistance is an important component to the cathodic protection system. A steady long term resistance trend is desirable from a cathodic protection perspective as this indicates the rectifier-anode-pipe electrical profile is stable. Many factors on site influence resistance, including anode degradation, drying of the ground bed, formation and growth of holidays in the pipe coating and environmental changes. Soil resistance may be influenced by moisture, temperature, presence of ions and soil type. Seasonal moisture and temperature changes may also be strong drivers of cyclical soil resistance. Depending on when and how these changes manifest, the resistance may gradually or suddenly change over time.

The cathodic protection industry has relied on system resistance, commonly calculated using voltage and amperage data collected from rectifiers, as a leading indicator of rectifier ground bed performance. Voltage and amperage data may also be collected from operator inputs. However, much of the analysis of this data is performed manually, irregularly, and on a limited data set of few assets. Accordingly, prior methods are limited in terms of the depth of insight that can be generated.

In recent decades, advances in cellular and satellite communications have enabled remote monitoring of the electrical parameters associated with cathodic protection. This has enabled more frequent collection of data and a reduced time commitment for collection of data from sites which are difficult for an operator to reach. Such remote monitoring may be conducted by collecting data from remote monitoring units (RMUs) physically coupled or in electronic communication with one or more of the rectifiers positioned along the pipeline.

Developments in machine learning permit the readings from remote monitoring units to be classified and joined with location specific metadata of the soil, pipeline, ground bed, anode and rectifier. Such developments permit for predictions of resistance trends at a rectifier site to be made without reliance on resistance readings.

SUMMARY

The present disclosure relates to the training and implementation of one or more classification models for predicting resistance trends in soil. More particularly, the present disclosure relates to the training and implementation of one or more machine learning models for predicting resistance trends in ground beds for pipeline cathodic protection systems.

Pipeline cathodic protection systems require maintenance from time to time, such as to replace or repair infrastructure. Some maintenance events, such as the replacement of an anode bed, or ground bed, can be a considerable capital project. Predicting when an anode can be expected to move from a steady state condition into a condition of deterioration or failure is a valuable insight for both cathodic protection technicians and planning engineers as they plan and budget for future operation.

Developments in machine learning enable classification of the long-term resistance trends on an impressed current cathodic protection system as measured by large number of remote monitoring units over large geographical areas. Classification of trends may be joined with location-specific metadata of the soil, pipeline, ground bed, anode and rectifier, among other data sets. A classification model may be trained to predict trends, both short-term and long-term, using such metadata features. Thereby, predictions may be made without reliance upon resistance readings. This is advantageous since predictions for long-term resistance trends may be made at any site, regardless of whether the site has been in operation for an extended period of time, whether it is freshly installed or whether it is a prospective site with no installation having been put in place. This provides greater insights when planning maintenance or new site installation, for example. Selection of sites for rectifier installation could be prioritized based on expected resistance trends. Resistance trend classification predictions may be used as a life cycle predictor for ground beds and anodes used with a pipeline.

In one aspect, there is provided a computer-implemented method of training a classification model including the steps of obtaining, by at least one computer, a plurality of historical resistance trends from a plurality of installed rectifier sites and rectifier site metadata for each installed rectifier site of the plurality of installed rectifier sites; labelling each historical resistance trend of the plurality of historical resistance trends as one of a plurality of historic resistance trend classifications; and, inputting into a machine learning algorithm the historical resistance trends and the rectifier site metadata of the plurality of installed rectifier sites to train the classification model to output a predicted resistance trend classification in response to rectifier site metadata input into the model. The plurality of historic resistance trend classifications may include increasing resistance trend, decreasing resistance trend and steady resistance trend. The predicted resistance trend classification may be one of an increasing resistance trend, a decreasing resistance trend and a steady resistance trend.

Inputting the rectifier site metadata may further include extracting a set of features from the rectifier site metadata of each installed rectifier site and inputting the set of features into the machine learning algorithm. The set of features may include at least one of a weather event and a human intervention.

The plurality of installed rectifier sites may be a first portion of available installed rectifier sites from which historical resistance trends is obtainable and the inputting step may further include inputting into the machine learning algorithm the historical resistance trends and the rectifier site metadata of the first portion of the installed rectifier sites to train the classification model. The method may further include the step of inputting into the trained classification model the rectifier site metadata of a second portion of available installed rectifier sites to test predictive accuracy of the trained model.

In another aspect, there is provided a system including at least one computer and at least one non-transitory computer-readable media storing computer-readable instructions that, when executed by the at least one computer, cause the at least one computer to train a classification model. The computer-readable instructions include obtaining, by at least one computer, a plurality of historical resistance trends from a plurality of installed rectifier sites and rectifier site metadata for each installed rectifier site of the plurality of installed rectifier sites; labelling each historical resistance trend of the plurality of historical resistance trends as one of a plurality of historic resistance trend classifications; and, inputting into a machine learning algorithm the historical resistance trends and the rectifier site metadata of the plurality of installed rectifier sites to train the classification model to output a predicted resistance trend classification in response to rectifier site metadata input into the model. The plurality of historic resistance trend classifications may include increasing resistance trend, decreasing resistance trend and steady resistance trend. The predicted resistance trend classification may be one of an increasing resistance trend, a decreasing resistance trend and a steady resistance trend.

Inputting the rectifier site metadata may further include extracting a set of features from the rectifier site metadata of each installed rectifier site and inputting the set of features into the machine learning algorithm. The set of features may include at least one of a weather event and a human intervention.

The plurality of installed rectifier sites may be a first portion of available installed rectifier sites from which historical resistance trends is obtainable and the inputting step may further include inputting into the machine learning algorithm the historical resistance trends and the rectifier site metadata of the first portion of the installed rectifier sites to train the classification model. The instructions may further include inputting into the trained classification model the rectifier site metadata of a second portion of available installed rectifier sites to test predictive accuracy of the trained model.

In another aspect, there is provided at least one non-transitory computer-readable media storing computer-readable instructions that, when executed by at least one computer, cause the at least one computer to predict rectifier resistance trends. The computer-readable instructions include obtaining, by at least one computer, a plurality of historical resistance trends from a plurality of installed rectifier sites and rectifier site metadata for each installed rectifier site of the plurality of installed rectifier sites; labelling each historical resistance trend of the plurality of historical resistance trends as one of a plurality of historic resistance trend classifications; and, inputting into a machine learning algorithm the historical resistance trends and the rectifier site metadata of the plurality of installed rectifier sites to train the classification model to output a predicted resistance trend classification in response to rectifier site metadata input into the model. The plurality of historic resistance trend classifications may include increasing resistance trend, decreasing resistance trend and steady resistance trend. The predicted resistance trend classification may be one of an increasing resistance trend, a decreasing resistance trend and a steady resistance trend.

Inputting the rectifier site metadata may further include extracting a set of features from the rectifier site metadata of each installed rectifier site and inputting the set of features and the rectifier site metadata into the machine learning algorithm. The set of features may include at least one of a weather event and a human intervention.

The plurality of installed rectifier sites may include a first portion of available installed rectifier sites from which historical resistance trends is obtainable and the inputting step may further include inputting into the machine learning algorithm the historical resistance trends and the rectifier site metadata of the first portion of the installed rectifier sites to train the classification model. The instructions may further include inputting into the trained classification model the rectifier site metadata of a second portion of available installed rectifier sites to test predictive accuracy of the trained model.

In another aspect, there is provided a computer-implemented method of predicting rectifier site resistance trends. The method includes the steps of receiving, by at least one computer, rectifier site metadata specific to a rectifier site and generating, by the at least one computer, a predicted resistance trend classification for the rectifier site by inputting the rectifier site metadata into a classification model trained to receive as input rectifier site metadata and to output a predicted resistance trend classification in response to the received rectifier site metadata. The method may further include the step of generating, by the at least one computer, an outcome score indicating a likelihood that the predicted resistance trend classifications is true.

The predicted resistance trend classification may be one of a plurality of predicted resistance trend classifications. The outcome score may be one of a plurality of outcome scores, each associated with a corresponding one of the plurality of predicted resistance trend classifications and each indicating a likelihood that an associated one of the plurality of predicted resistance trend classifications is true.

The predicted resistance trend classification may be used for at least one of planning installation of a rectifier at the rectifier site, planning installation of at least one anode at the rectifier site, planning installation of a ground bed at the rectifier site, planning replacement of a ground bed at the rectifier site and planning maintenance at the rectifier site.

These general and specific techniques may be implemented using a system, a method, a non-transitory computer readable media, a computer program, or any combination of systems, methods, media, and programs. For example, the techniques can be implemented using one or more non-transitory computer-readable media storing instructions that, when executed by at least one computer cause the at least one computer to perform the described actions.

BRIEF DESCRIPTION OF THE DRAWINGS

Exemplary non-limiting embodiments are described with reference to the accompanying drawings in which.

DETAILED DESCRIPTION

The present disclosure relates to the training and implementation of one or more classification models for predicting resistance trends in soil. More particularly, the present disclosure relates to the training and implementation of one or more machine learning models for predicting resistance trends in ground beds for pipeline cathodic protection systems.

Figure 1:
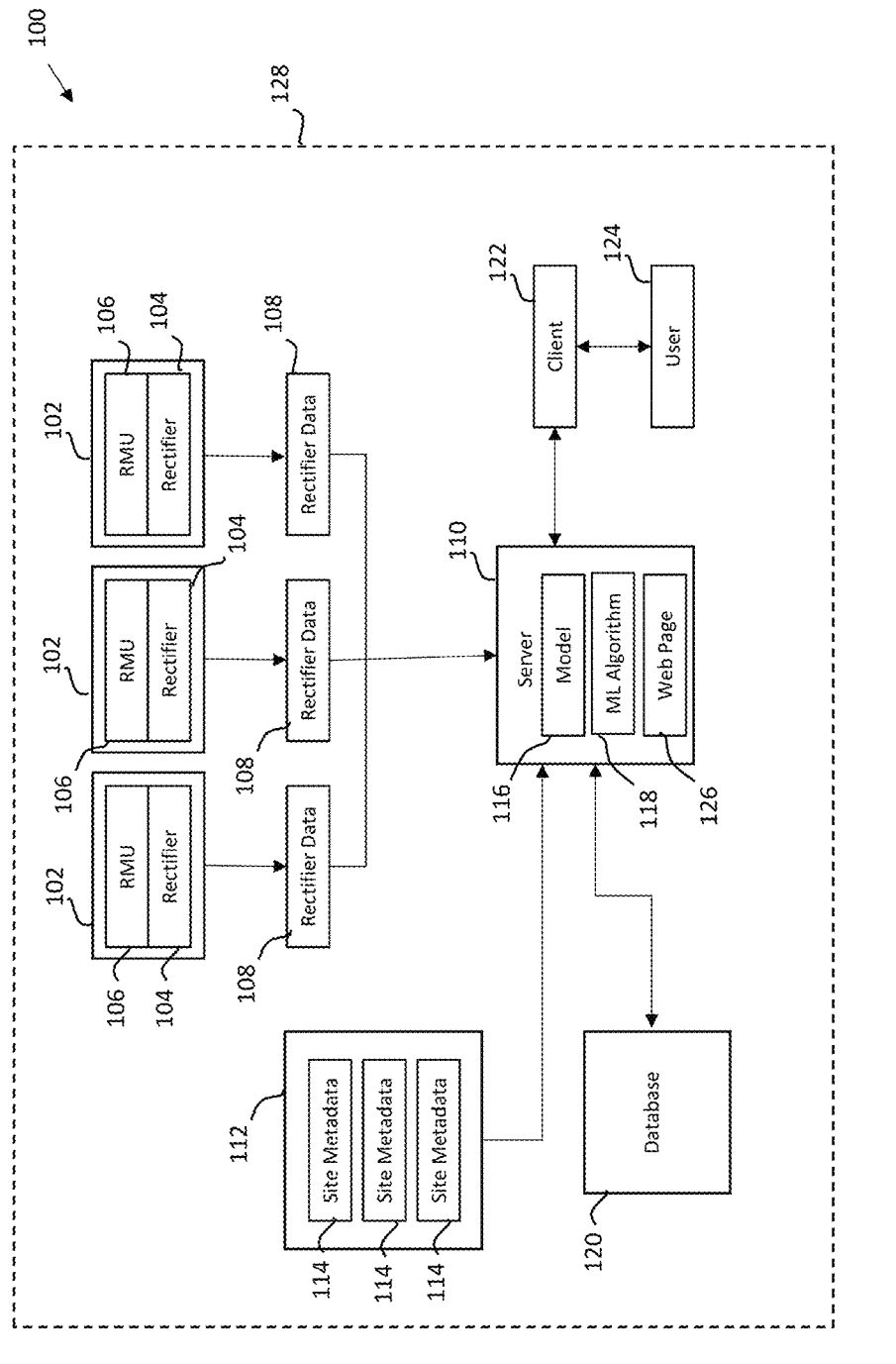
FIG. 1 is a diagram representing a system in accordance with an aspect of the present invention.

With reference to FIG. 1, there is shown system 100 for predicting resistance trends at a rectifier site 102. The rectifier site 102 may be an established or installed rectifier site having a rectifier installed thereat or may be a prospective site at which a rectifier may potentially be installed. In FIG. 1, there is shown three rectifier sites 102. However, system 100 may include as few as one rectifier site 102 or any number of rectifier sites 102. Each rectifier site 102 includes a rectifier 104 and a remote monitoring unit (RMU) 106 in data communication with the rectifier 104 of the rectifier site 102. The remote monitoring unit 106 receives rectifier data 108 from rectifier 104 and transmits the received rectifier data 108 to server 110. Rectifier data 108 may include, for example, voltage and current measurements from the rectifier 104. Preferably, data communication between the remote monitoring unit 106 and the server 110 is wireless and may be via cellular or satellite communication. Server 110 may represent one or multiple computer systems or server systems. In some implementations, server 110 may be a cloud computing platform.

System 100 further includes at least one rectifier site metadata storage device 112 having stored thereon rectifier site metadata 114 for each of the rectifier sites 102. Rectifier site metadata storage device 112 may include one or more data storage devices having stored thereon rectifier site metadata 114. Accordingly, the rectifier site metadata 114 associated with a single rectifier site 102 may be retrieved from multiple sources. In one aspect, rectifier site metadata 114 includes geographic data, such as soil characteristic data, and pipeline-anode-ground bed data. Soil characteristics may be retrieved from public databases such as a national soil database. Pipeline-anode-ground bed data may be data which has been input by one or more pipeline operators and stored for later retrieval. Also, data relating to weather events, such as periods of unusually high rainfall, floods or droughts or the dates and circumstances of any significant human interventions, such as ground bed or anode maintenance and replacement, may be included as rectifier site metadata. Such information may be retrieved from any suitable database or from pipeline operator data. Thereby, natural and human occurrences may be distinguished in the metadata.

Accordingly, rectifier site metadata 114 may include any cathodic protection relevant features related to a rectifier site 102 that include physical, environmental, and/or installation characteristics of each rectifier site and are absent voltage, current, or other electrical measurements from a rectifier. Rectifier site metadata 114 may include, for example, soil characteristics and pipeline data, anode data and ground bed data, soil order, slope, surface vegetation and drainage characteristics or any other data related to the site and the geographic and/or geospatial conditions thereat. Rectifier site metadata 114 may also be provided by pipeline operators. This metadata may include details such as pipe material, pipe diameter, anode depth, anode spacing, data related to maintenance and human intervention events, and rectifier install date. A list of cathodic protection relevant features which may be used as site metadata is found in Table 1, below. The features listed in Table 1 are not exhaustive of metadata available to the model for training or for execution of the trained model. For clarity, as used herein, "rectifier site metadata" and "site-specific metadata features" do not include voltage, current, or other electrical measurements from a rectifier.

TABLE 1

Cathodic Protection Relevant Features

| Grouping | Feature | Description | Type |
|---|---|---|---|
| groundbed | groundbed_anodecentrespacing | Spacing between anodes | Numerical |
| groundbed | groundbed_code | Groundbed material code | Categorical |
| groundbed | groundbed_constructionseason | Construction season (winter, spring, summer, fall) | Categorical |
| groundbed | groundbed_constructionyear | Construction year | Numerical |
| groundbed | groundbed_deepwelldiameter | Diameter of deepwell groundbed | Numerical |
| groundbed | groundbed_landform | Leveling degree of land | Categorical |
| groundbed | groundbed_totaldepth | Total depth to the bottom of groundbed | Numerical |
| groundbed | groundbed_type | Groundbed set up - shallow or deep | Categorical |
| groundbed | groundbed_type2 | Groundbed set up - remote or distributed | Categorical |
| pipe | pipe_dateinstalled | Date of pipe installation | Numerical |
| pipe | pipe_linecoating | Type of coating | Categorical |
| pipe | pipe_manufacturer | Manufacturer name | Categorical |
| pipe | pipe_minimumyieldstrength | Minimum yield strength of pipe | Numerical |
| pipe | pipe_outerwrap | Type of outer wrap | Categorical |
| pipe | pipe_outsidediameter | Outer pipe diameter | Numerical |
| pipe | pipe_seamtype | Seam type | Categorical |
| pipe | pipe_specification | Specification code | Categorical |
| pipe | pipe_tieincoating | Tie in coating type | Categorical |
| pipe | pipe_wallthickness | Pipe wall thickness | Numerical |
| pipe | pipe_weldapplication | Weld application technique | Categorical |
| pipe | pipe_weldcoating | Weld coating type | Categorical |
| rectifier | rectifier_outputvolts | Rated output voltage of rectifier | Numerical |
| rectifier | rectifier_ratedinputamps | Rated input current of rectifier | Numerical |
| rectifier | rectifier_ratedinputvolts | Rated input voltage of rectifier | Numerical |
| rectifier | rectifier_ratedoutputcurrent | Rated output current of rectifier | Numerical |
| soil | soil_drainage | Soil drainage class | Categorical |
| soil | soil_modeofdeposition | Mode of deposition | Categorical |
| soil | soil_parentmaterialchemical1 | Chemical property of upper layer (acidity and calcareousness) | Categorical |
| soil | soil_parentmaterialchemical2 | Chemical property of second layer (acidity and calcareousness) | Categorical |
| soil | soil_parentmaterialchemical3 | Chemical property of third layer (acidity and calcareousness) | Categorical |
| soil | soil_parentmaterialtexture2 | Texture of second layer | Categorical |
| soil | soil_parentmaterialtexture3 | Texture of third layer | Categorical |
| soil | soil_rootrestrictionlayer | Soil layer which restricts root growth | Categorical |
| soil | soil_slope | Slope at surface | Numerical |
| soil | soil_soilgroup2nded | Soil grouping classification ($2^{nd}$ edition) | Categorical |
| soil | soil_soilorder2nded | Soil order classification ($2^{nd}$ edition) | Categorical |
| soil | soil_soilorder3rded | Soil order classification ($3^{rd}$ edition) | Categorical |
| soil | soil_surfacematerial | Primary material at surface | Categorical |
| soil | soil_typeofrootrestriction | Type of root restricting layer | Categorical |
| soil | soil_watertable | Water table characteristics | Categorical |

Rectifier site metadata 114 is available to and retrievable by the server 110 independently from or concurrently with the rectifier data 108 provided by the remote monitoring unit 106. However, rectifier site metadata 114, as used herein, includes physical, environmental, and/or installation characteristics of each rectifier site and which are absent voltage, current, or other electrical measurements from a rectifier. Moreover, rectifier site metadata 114 is specific to geographic region or geographic location. Since the location of the rectifier site 102 is known by its latitude and longitude coordinates, for example, the rectifier site metadata 114 specific to a rectifier site 102 is readily identifiable.

System 100 includes classification model 116 which is preferably stored on server 110. Classification model 116 is preferably a machine-learning model trained by a machine learning algorithm 118 using rectifier site metadata 114 and historical rectifier data 108 collected from rectifiers sites 102 having rectifiers 104 installed thereon. Preferably, machine learning algorithm 118 is also stored on server 110. The training of the classification model 116 is discussed in further detail hereinbelow. Once trained, classification model 116 may be executed using rectifier site metadata 114 as input to predict rectifier resistance trends and preferably, long-term rectifier resistance trends, at rectifier sites 102 independently of rectifier site data 108.

This is advantageous since predictions for long-term resistance trends may be made at any rectifier site 102, regardless of whether the site has been in operation for an extended period of time, whether it is freshly installed or whether it is a prospective site with no rectifier 104 having been installed. This provides insights into future maintenance or cost demands when planning maintenance or new site installation. For example, a resistance trend which is predicted to change over time may be indicative of a potential failure of the ground bed. Prediction facilitates planning of preventative maintenance at a rectifier site, thereby reducing the likelihood that maintenance must be urgently performed in the event of a failure or in the face of an imminent failure presented without much warning. Prediction also enables more targeted and efficient capital expenditure planning, with operators having better visibility into asset performance risks for purposes of prioritizing capital replacements. Moreover, resistance trend predictions provide insight into the quality of a prospective rectifier site. Elimination of low-quality candidate sites provides advantage in avoiding downstream maintenance costs.

In view of the above, server 110 may perform a number of functions, such as receiving, recording and tracking site metadata 114, recording and tracking rectifier data 108 from installed cathodic protection system rectifiers 104, training classification model 116, executing classification model 116, after it is trained, with input data, which may include rectifier site metadata 114 and generating one or more predicted resistance trend classifications as outputs of the classification model 116.

In one aspect, system 100 may further include secure database 120 in data communication therewith. Secure database 120 may store any suitable data such as rectifier data 108, outputs of the machine learning algorithm 118, training outputs of the classification model 116, predictive outputs of the trained classification model 116 and/or other information which may be generated by, received by or utilized by server 110. Database 120 may be, for example, one or more data storage devices, a database server, or other data storage system.

System 100 also includes one or more client devices 122 in communication with server 110. Client device 122 may be accessible by a user 124, such as a pipeline operator. Client device 122 may receive the outputs of the trained classification model 116 or may serve as a means for the user to modify the classification model 116 during or apart from training. Each client device 122 may be an electronic device such as a desktop computer, a laptop computer, or a mobile device such as a cellular phone, smartphone or tablet computer. In one aspect, the client device 122 may be the local computer system of a pipeline operator acting as user 124. Output of the trained classification model 116 may be sent directly to the client device 122 or may be stored on a web page 126 hosted by server 110. The pipeline operator may navigate to the web page 126 to retrieve the output of the trained classification model 116.

Elements of system 100, such as server 110 communicate with one another through communication network 128. Communication network 128 can be a combination of wired and/or wireless networks and may include private networks and/or public networks, such as the Internet. In some embodiments, network 128 may include wide area data or cellular telephony networks.

Figure 2:
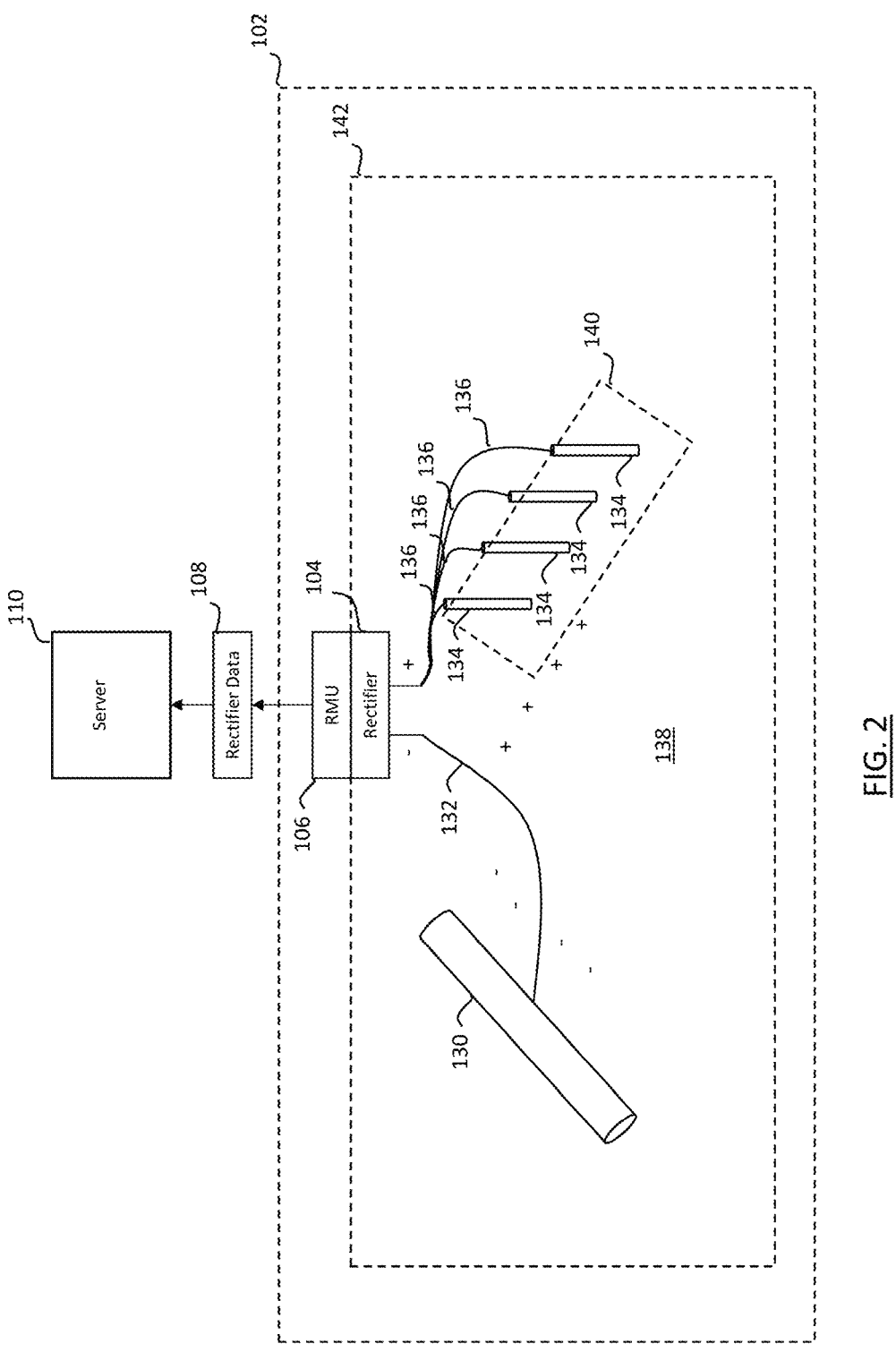
FIG. 2 is a diagram representing a rectifier site in accordance with an aspect of the present invention.

It should also be understood that server 110, metadata storage device 112 and rectifier site 102 may be in the same geographic area or may be geographically distant from one another. Accordingly, one or more of server 110, metadata storage device 112 and rectifier site 102 may be in the same general location. Alternatively, one or more of server 110, metadata storage device 112 and rectifier site 102 may be in different geographic areas and potentially in different countries. Thereby, server 110 may receive and process rectifier data 108 and rectifier site metadata 114 collected from any geographic location.

Where a rectifier 104 is installed at the rectifier site 102, the rectifier site 102 is referred to herein an installed rectifier site 102. FIG. 2 illustrates an exemplary installed rectifier site 102 in further detail. Installed rectifier site 102 has a rectifier 104 installed thereon. Remote monitoring unit 106 is coupled with rectifier 104 in data exchange communication therewith. Preferably, rectifier 104 and remote monitoring unit 106 are physically coupled in data exchange communication with one another via a suitable data exchange interface (not shown). Rectifier 104 is electrically coupled with pipeline 130, which is a structure to be protected from corrosion, via one or more electrically conductive cables 132 or other suitable coupling. Rectifier 104 is also electrically coupled with one or more anodes 134, via one or more electrically conductive cables 136 or other suitable coupling. The electric circuit between pipeline 130 and anodes 132 is completed by soil 138. Rectifier 104 is preferably an impressed current rectifier 104 and provides an electric current which counteracts the electrochemical process of corrosion. The volume of material surrounding anodes 132 is referred to as a ground bed 140. Ground bed 140 provides a medium with a low resistance to ground so that protective current may leave anodes 132 and reach soil 138. The rectifier 104 in electrical communication with pipeline 130 and anodes 132, provides a cathodic protection system 142 to protect pipeline 130. Pipeline 130 may be continuous and extend over large distances. Accordingly, a plurality of rectifiers 104 may be spaced apart along pipeline 130 to provide cathodic protection along the length of pipeline 130 section by section thereof.

Remote monitoring unit 106 receives and stores voltage and current readings from rectifier 104. Using Ohm's Law, resistance may be obtained by dividing voltage values by corresponding current values. The voltage, current and resistance readings may be captured as rectifier data 108 by remote monitoring unit 106 on a constant basis or at a predetermined frequency such as hourly, to once weekly. Remote monitoring unit 106 may also store rectifier data 108 for a period of time. Remote monitoring unit 106 is in data communication with server 110 and uploads rectifier data 108 to server 110. The rectifier data 108 may then be stored in secure database 120 for later use in training the classification model 116 or may be input directly into the classification model 116.

The classification model 116 is trained using training data which includes rectifier site metadata 114 and historical resistance trends from installed rectifier sites producing or having produced voltage and current data from which resistance trends can be calculated.

In one exemplary aspect, rectifier 104 is a transformer rectifier 104 outputting a near constant voltage controlled by manually configuring a physical tap (not shown). In this aspect, rectifier data 108, may include, for example, DC voltage, DC current, Global Positioning System (GPS) location data, ambient temperature and whether the remote monitoring unit was performing a synchronized interruption of the rectifier at the time a reading was taken. In this aspect, system resistance is independent of tap changes on the rectifier. Accordingly, changes in the resistance data are more likely to be correlated with physical changes to the system than with tap changes at the rectifier. This may provide more relevant information to operators. Depending on seasonal factors and the physical setup of the rectifier-anode-pipeline system, the resistance may fluctuate cyclically with a one-year period. Soil resistance may be influenced by moisture, temperature, presence of ions and soil type. Seasonal moisture and temperature changes are two important factors which drive cyclical soil resistance.

Figure 3:
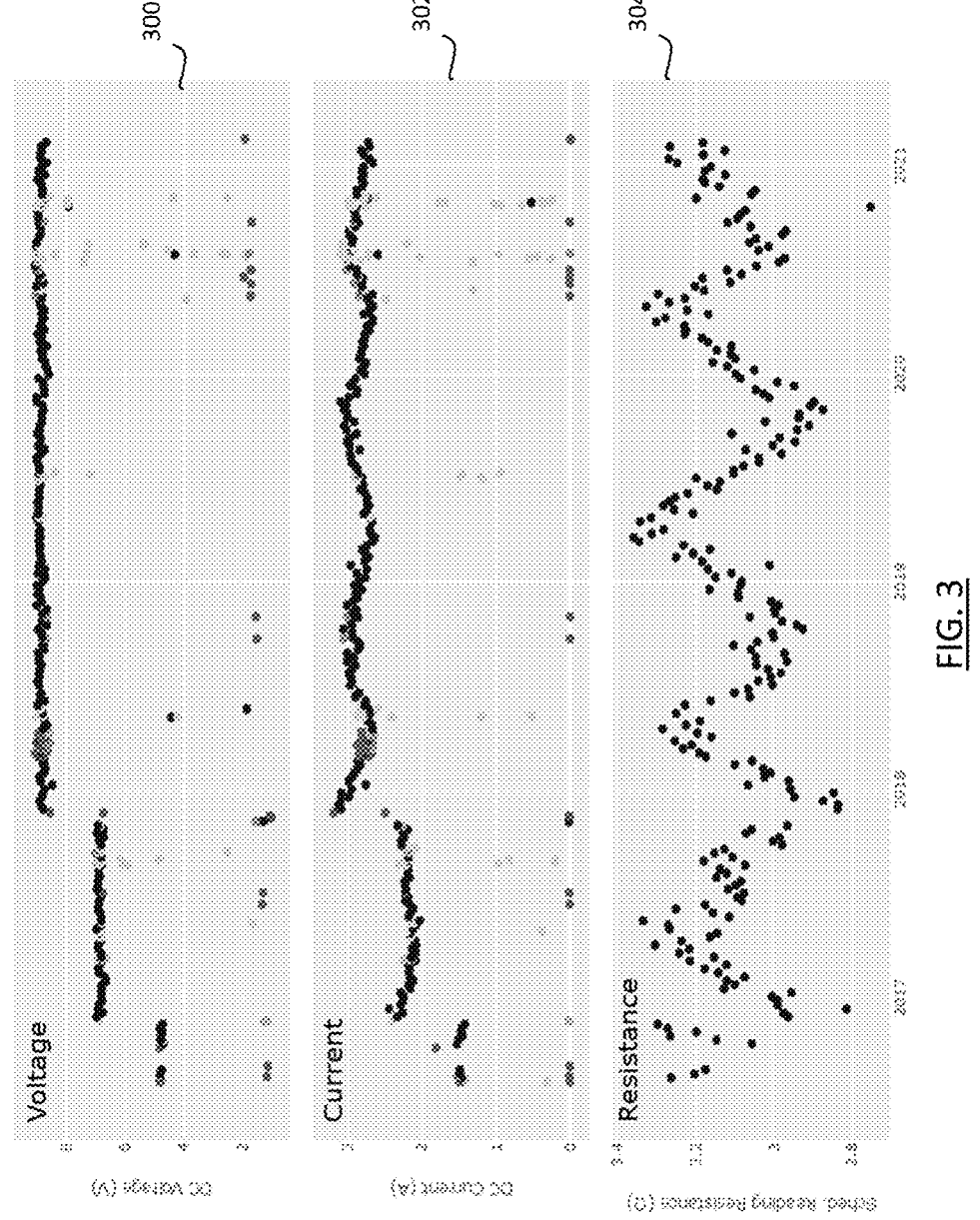
FIG. 3 is a chart representing historical voltage, current and resistance trends for a rectifier.

FIG. 3 illustrates an example of historic voltage, current and calculated resistance for a remote monitoring unit on a rectifier over a four-year period. Direct Current (DC) voltage trend 300 is illustrated at the top section of FIG. 3. The DC current 302 corresponding to the DC voltage readings is illustrated at the middle section of FIG. 3. The resistance values 304 calculated according to Ohm's Law are shown at the bottom section of FIG. 3. Equation 1, below, describes the sinusoidal trend of system resistance 304 as shown in FIG. 3, with A representing amplitude of resistance variation, t representing the normalized calendar date (which will fall between 0 and 1 with 0 representing January $1^{st}$ and 1 representing December $31^{st}$, $\varphi$ representing the phase-offset or physically the calendar date where maximum resistance is observed, and $y_0$ representing the nominal average resistance.

$$y=A\cos(2\pi t-\varphi)+y_0 \qquad [1]$$

A repository of historic rectifier data facilitates the tracking of long-term resistance trends over time. Trends which are statistically significant may be identified to provide historical resistance trends suitable for training the classification model 116. Identification of the statistically significant trends may be done in any suitable manner.

Figure 4:
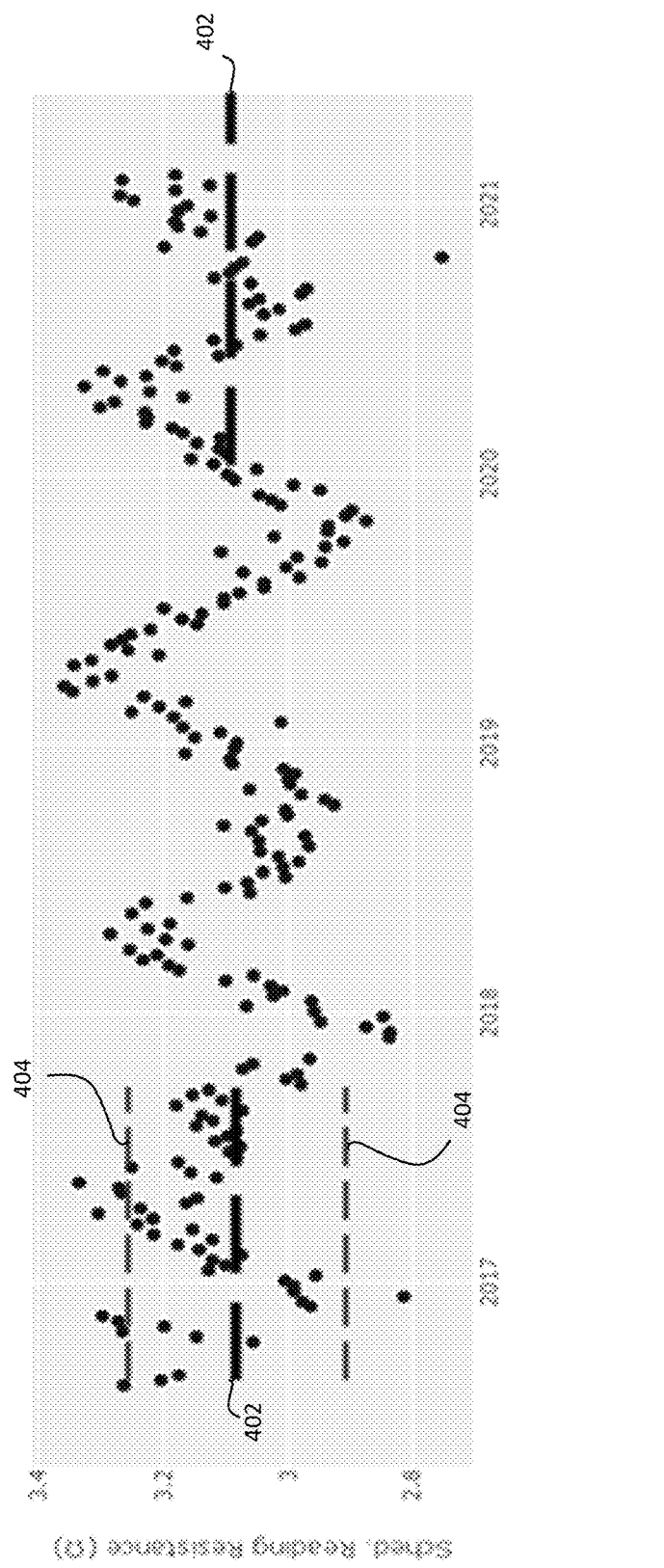
FIG. 4 is a chart representing historical resistance trend for a rectifier.

In one aspect shown in FIG. 4, there is shown historic rectifier data 400 showing resistance over the same four-year period as referenced above with respect to FIG. 3. In the example scenario shown in FIG. 4, the mean ($\mu$) and standard deviation ($\sigma$) are calculated over the course of the first year of readings. These are used to provide thresholds for identification of statistically significant trends in the historic rectifier data. Mean resistance trends in the first and last year are shown using a broad dashed line 402. A threshold of twice the standard deviation above and below the mean is displayed using narrow dashed lines 404. A second calculation of the most recent year's mean is performed, and a check is made to determine if this value is above or below the threshold. This is shown in Equation 2, below:

$$\mu_{year\ N} > \mu_{year\ 1} + 2\sigma_{year\ 1}\ OR\ \mu_{year\ N} < \mu_{year\ 1} - 2\sigma_{year\ 1} \qquad [2]$$

In this way, long-term, multi-year readings trends for each remote monitoring unit in a rectifier system may be determined. In the aspect illustrated by FIG. 4, the rectifier system is an impressed current cathodic protection (ICCP) rectifier system.

Figure 5:
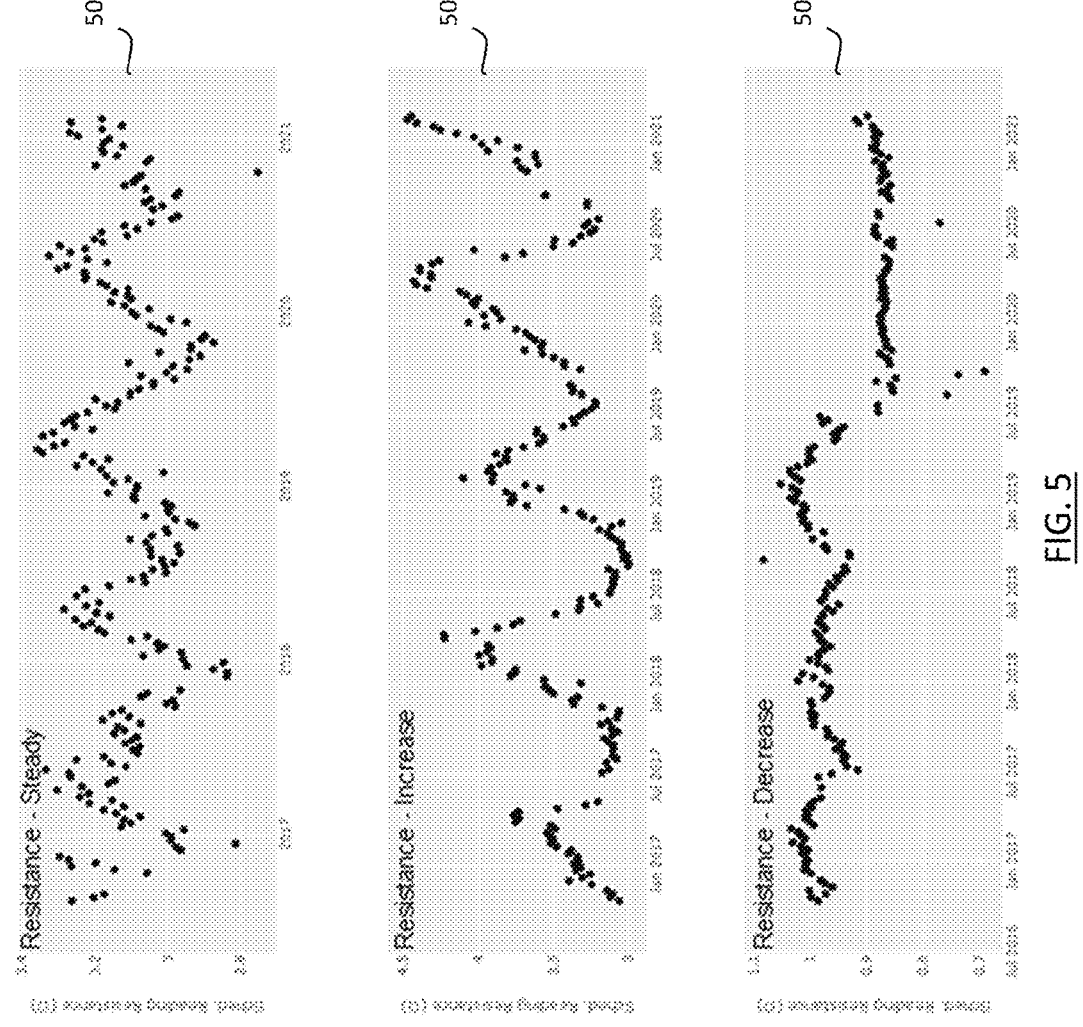
FIG. 5 is a chart representing classifications for historical resistance trends for rectifiers.

Resistance trends at a rectifier may take different forms. FIG. 5 illustrates, as an example, three historic resistance trend plots from remote monitoring units at three different locations. The resistance trends include a steady resistance trend 500, an increasing resistance trend 502 and a decreasing resistance trend 504.

For the purposes of training the model, each installed rectifier site from which rectifier data is collected is described by rectifier site metadata 114. In a preferred aspect, a set of cathodic protection relevant features is extracted from the rectifier site metadata 114. Such features may include pipeline, ground bed, anode, rectifier, and soil characteristics, for example. Reference may be made to Table 1, above for further cathodic protection relevant features.

Additionally, each installed rectifier site from which historical rectifier data is collected has an associated label derived from the resistance trend over time. Those labels may be, "steady", "increase" or "decrease", as shown, for example, in FIG. 5.

With training data prepared, machine learning algorithm 118 may train classification model 116. Once trained, the classification model 116 will accept the rectifier site metadata 114 of a rectifier site and generate a predicted resistance trend classification without ever receiving as inputs the voltage or current readings captured by a remote monitoring unit at that site. Accordingly, in this preferred aspect, the target feature for the classification model is the resistance trend. The rectifier site metadata and site-specific metadata features are absent voltage, current, or other electrical measurements from a rectifier. Therefore, the predicted resistance trend classification is generated independent of voltage, current, and resistance measurements at any rectifier site.

To train the classification model 116, rectifier site metadata 114 and rectifier site data 108 of installed rectifier sites 102 are input to the machine learning algorithm 118. Preferably, the cathodic protection relevant features are extracted from rectifier site metadata 114 so that the rectifier site 102 is described to machine learning algorithm 118 in terms of the cathodic protection relevant features.

Machine learning algorithm 118 may include any suitable machine learning algorithm. In one aspect, machine learning algorithm 118 is a decision tree and, preferably, is a gradient boosted decision tree algorithm such as xgboost performed in Python™.

A decision tree is made up of nodes and branches. Each node splits a decision based on one of the provided features of metadata 114, branching off into two further nodes. The nodes of the decision tree can split the data on categorical features. For example, a split may be made based on whether a rectifier site has a shallow or deep ground-bed. Decisions may also be based on numeric features. For example, a decision split may be based on whether the pipeline was installed after the year 1988. The decision tree may include multiple levels of nodes and branches. Too few levels may result in poor classification. Too many levels may result in over-fitting of the data. A gradient boosted approach, such as that provided by a xgboost machine learning algorithm, provides further optimization of the decision tree layout by generating a plurality of iterations of the decision tree layout, with each new iteration building on the results of the previously generated decision tree layout.

In one aspect, cathodic protection relevant features are assigned a predictive power score based on the importance to model 116. The importance of a feature is measured based on how beneficial the feature is to the predictive power of the model. Based on predictive power, variables of different types, such as numerical and categorical, are ranked relative to one another. Higher ranked variables may be positioned at higher-order positions in machine learning algorithm 118 so that they can influence the output of the model in approximate proportion to their level of importance.

Figure 8:
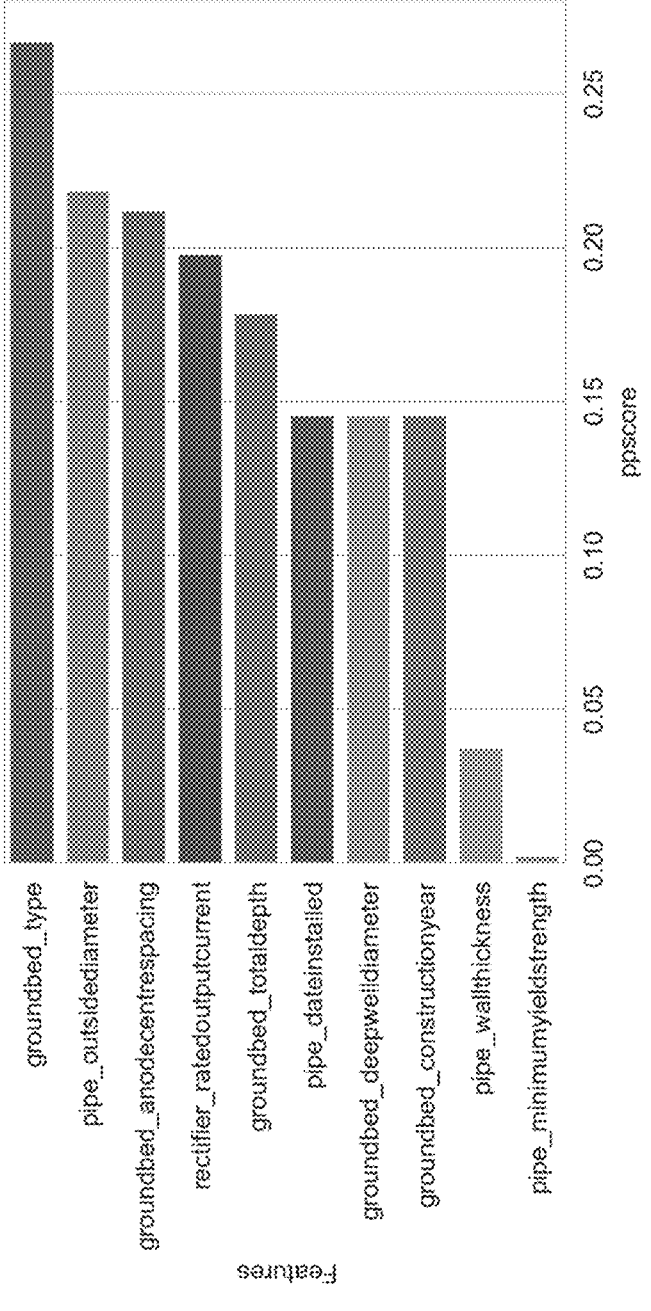
FIG. 8 is a chart showing the relative predictive power of a number of cathodic protection relevant features.

By way of example, there is shown in FIG. 8 ten features with their relative predictive power scores. In the aspect illustrated in FIG. 8, the ground bed type has the highest predictive power score, followed by the outside diameter of the pipe, the ground bed anode spacing, the rated output current of the rectifier, the ground bed depth, the date the pipe was installed, the diameter of the ground bed well, the year of ground bed construction, the pipe wall thickness and the pipe minimum yield strength, in that order. Each of the features listed in the predictive power score plot shown in FIG. 8 possess some statistically significant separability by comparing different resistance trends. Since no one feature is perfectly separable, it is preferable that a combination of features be used in the decision tree to make a prediction of the resistance trend. Although FIG. 8 illustrates certain features ranked according to their respective predictive power, it should be understood that predictive power score may change with different metadata, which may vary from site to site.

Figure 9:
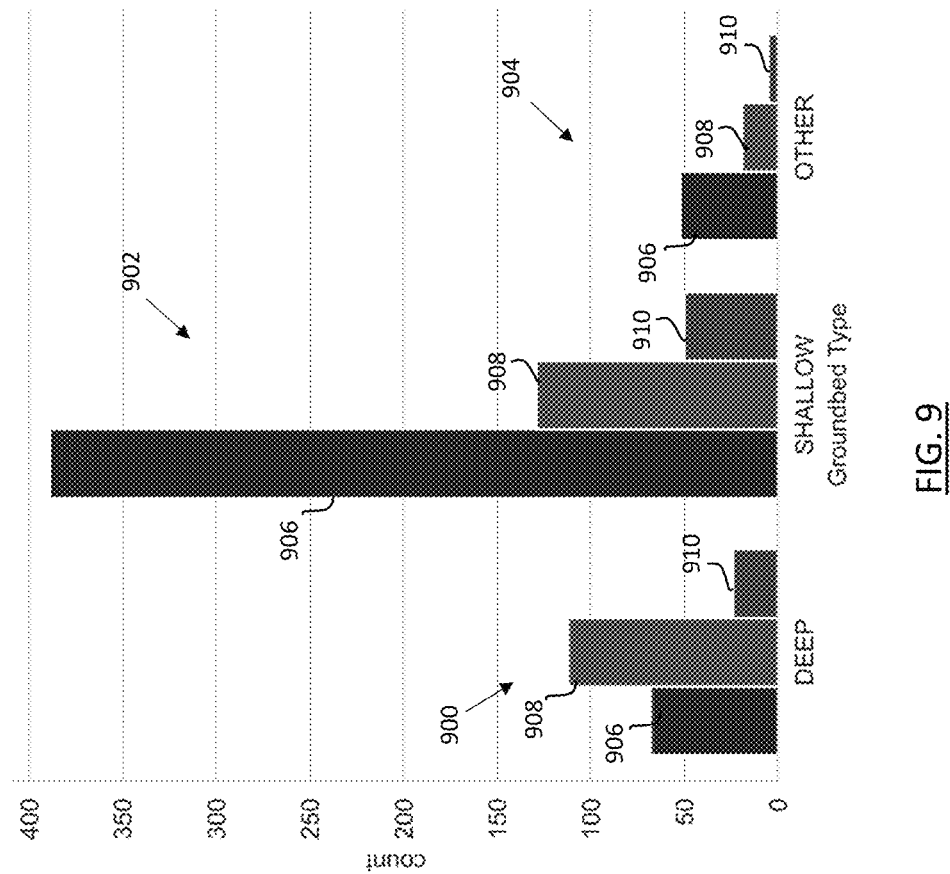
FIG. 9 is a chart illustrating predictive power of ground bed type for predicting resistance trend type.

The feature with the highest predictive power score is the ground bed type, which is a categorical feature. In the aspect shown in FIG. 9, this is split into "shallow" 900, "deep" 902 and "other" 904. In the aspect shown in FIG. 9, the shallow ground bed type 900 is more likely to have a steady resistance 906, when compared to deep ground bed type as opposed to an increasing resistance 908 or a decreasing resistance 910. One reason for this may be that deep ground beds use up the moisture in the soil over the years, without being naturally rehydrated through rain or snow events near the surface. Consumption of electrolyte near the anodes without natural replenishment may result a high ratio of in increasing resistance trends.

The next highly ranked predictive power score features are all numerical features. As such, a probability density plot may be generated for these features.

Figure 10:
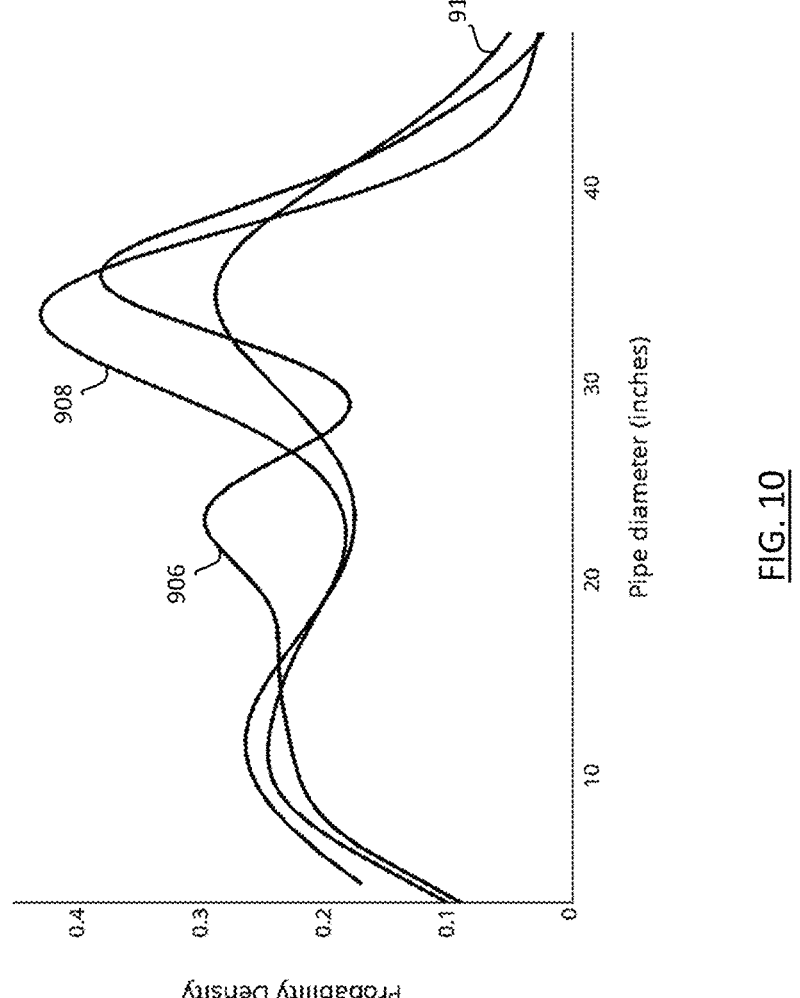
FIG. 10 is a probability density plot of pipe diameter for predicting resistance trend type.

FIG. 10 illustrates a probability density plot of the pipe diameter, which is a numerical feature. The probability of a specific diameter, in inches, exhibiting a steady resistance 906, increasing resistance 908 or decreasing resistance 910 trend is shown. For example, a pipe having a diameter of 20 to 25 inches would most likely result in a "steady" resistance trend classification. However, the decision tree may have a relatively even split for the resistance trend classifications at the upper and lower bounds of the pipe diameter.

Figure 11:
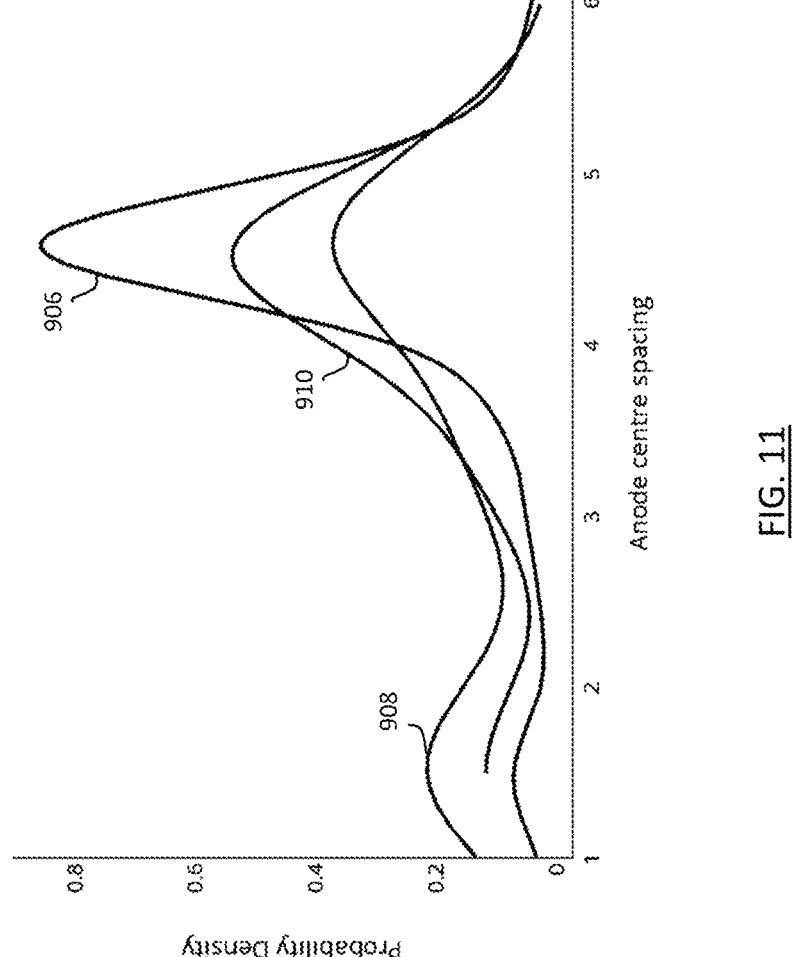
FIG. 11 is a probability density plot of anode center spacing for predicting resistance trend type.

FIG. 11 illustrates a probability density plot of the anode center spacing, which is a numerical feature. The probability of a specific anode spacing exhibiting a steady resistance 906, increasing resistance 908 or decreasing resistance 910 trend is shown. For example, anode spacing of about 4.5 would most likely result in prediction of a "steady" resistance trend classification.

Figure 12:
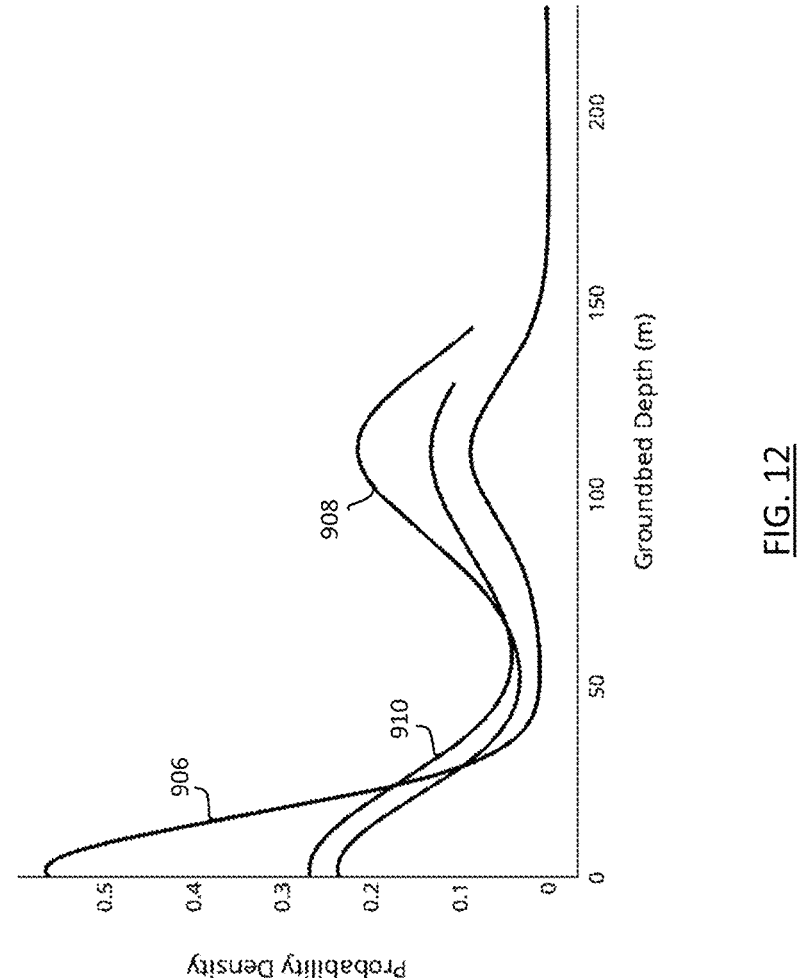
FIG. 12 is a probability density plot of ground bed depth for predicting resistance trend type.

FIG. 12 illustrates a probability density plot of the ground bed depth, which is a numerical feature. The probability of a specific depth, in meters, exhibiting a steady resistance 906, increasing resistance 908 or decreasing resistance 910 trend is shown. For example, a ground bed having a depth of about 130 meters would most likely result in prediction of an increasing resistance trend classification.

Figure 13:
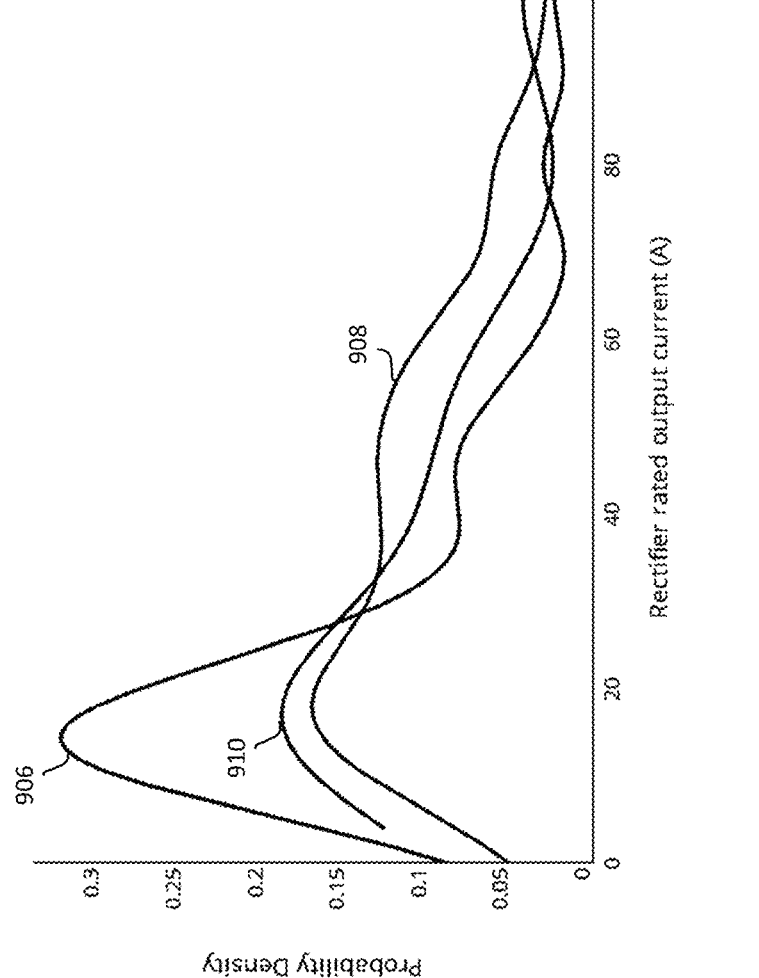
FIG. 13 is a probability density plot of rectifier rated output current for predicting resistance trend type; and, FIG. 14 is a probability density plot of installation date for predicting resistance trend type.

FIG. 13 illustrates a probability density plot of the rectifier rated output current, which is a numerical feature. The probability of a specific rated output current, in Amperes, exhibiting a steady resistance 906, increasing resistance 908 or decreasing resistance 910 trend is shown. For example, a rectifier having a rated output current of about 17 Amperes, would most likely result in prediction of a steady resistance trend classification.

Figure 14:
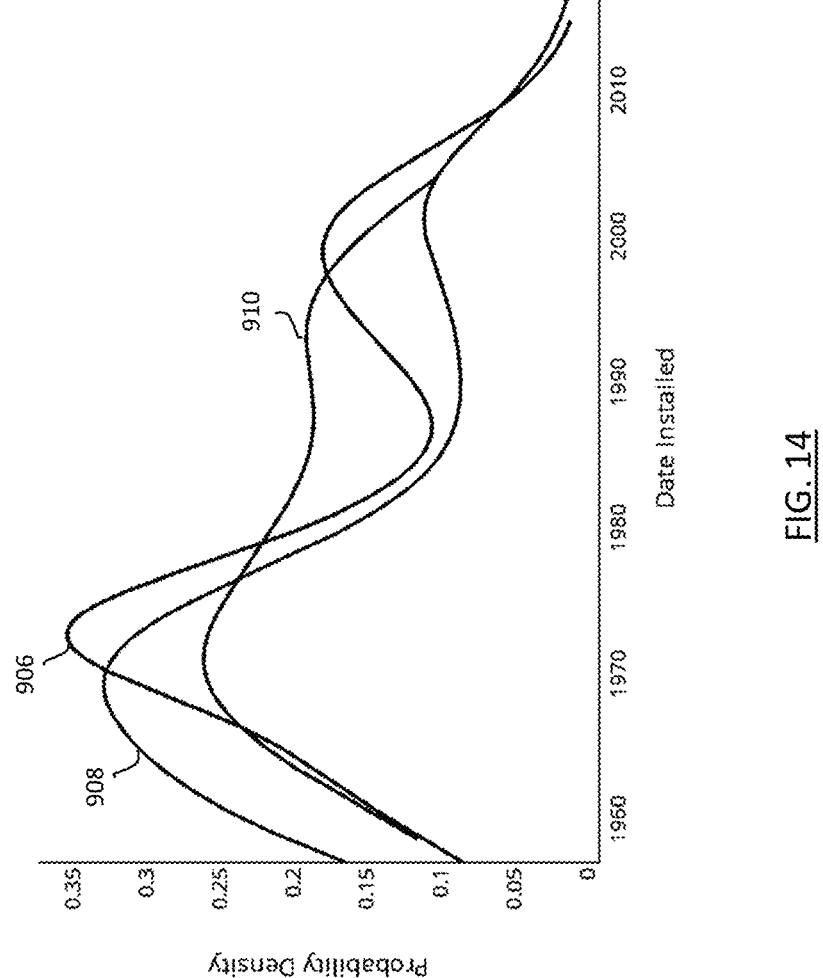

FIG. 14 illustrates a probability density plot of the ground bed installation date, which is a numerical feature. A ground bed installed in about 1988 would most likely result in prediction of a decreasing resistance trend classification.

In one aspect, the training data, which includes the rectifier site metadata 114 and the historical rectifier data 108, may be randomly sampled and split into training and testing data sets using, for example, an 80:20 train-to-test ratio. The decision tree model is generated by using a representative dataset including data from 80% of the installed rectifier sites, then the accuracy of the algorithm is established by making a prediction on data from the remaining 20% of the installed rectifier sites and comparing the predicted to the true labels.

This contributes to generation of a classification model which receives rectifier site metadata, including various combinations of cathodic protection relevant features, and predicts the long-term resistance trends at the rectifier site from which the rectifier site metadata was provided.

If one or more datasets is imbalanced, further algorithms may be employed to account for the imbalance. In one aspect, a Synthetic Minority Over-sampling Technique (SMOTE) algorithm may be applied to correct for an over-representation of datasets representing a specific resistance trend, such as a steady resistance trend.

The trained model could be applied, for example, in the selection of prospective or freshly installed rectifier sites, even before the first voltage or current reading is captured. By using the soil and pipeline metadata, a prediction may be made about the long-term resistance trend at the rectifier site, and which may allow operators to prioritize rectifier locations based on expected resistance trends.

Figure 6:
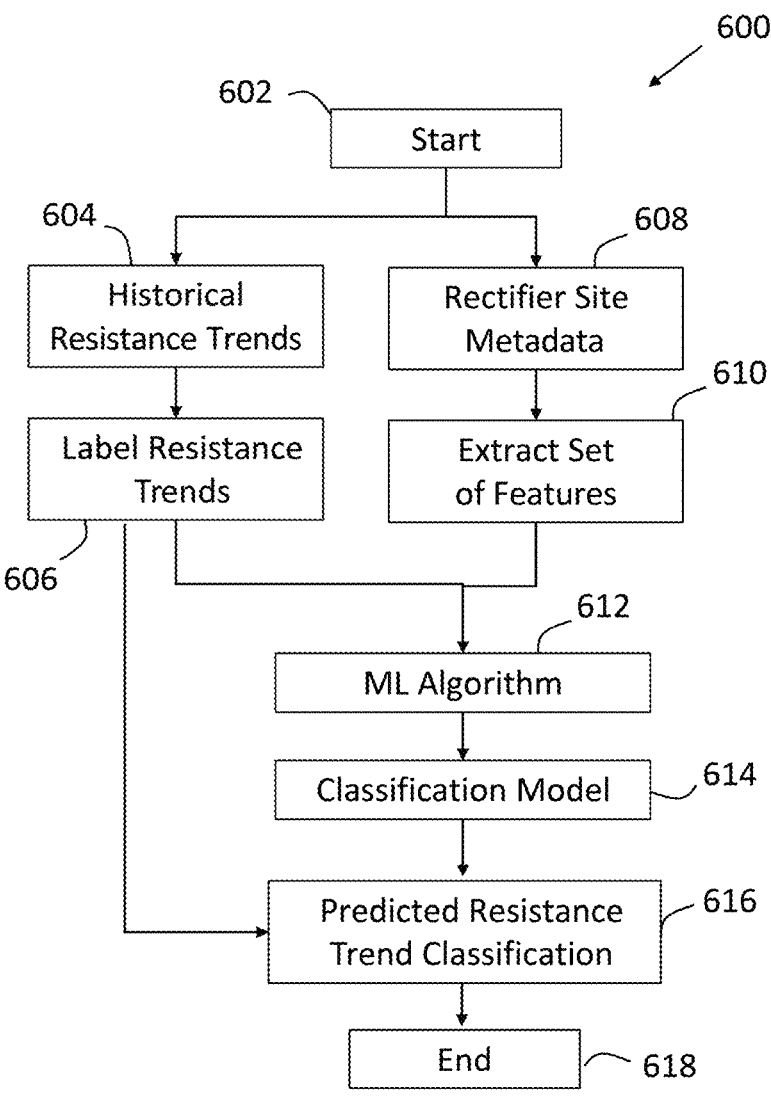
FIG. 6 is a flow diagram representing a method for training a classification model in accordance with an aspect of the present invention.

FIG. 6 illustrates a method 600 which is initiated a step 602 to initiate the training of classification model 116. At step 604, a plurality of historical resistance trends from a plurality of installed rectifier sites 102 is obtained. Each historical resistance trend of the plurality of historical resistance trends is labelled as one of a plurality of historical resistance trend classifications, as shown at step 606. The historical resistance trends may be labeled, for example, an increasing resistance trend, a decreasing resistance trend or a steady resistance trend. Likewise, at step 608, rectifier site metadata 114 for each installed rectifier site 102 of the plurality of installed rectifier sites 102 is obtained. In one aspect, a set of features may be extracted from the rectifier site metadata of each installed rectifier site 102, as shown at step 610. At step 612, the rectifier site metadata 116 of the plurality of installed rectifier sites 102 is input into machine learning algorithm 118 and, at step 614, machine learning algorithm 118 trains classification model 116. At step 616, classification model 116 generates as output a predicted resistance trend classification for each installed rectifier site 102 of the plurality of installed rectifier sites 102 and training of the model may end at step 618.

A successfully trained model 116 will accept the rectifier site metadata 114 of a rectifier site and generate a predicted resistance trend classification without ever receiving as inputs the voltage or current readings captured by a remote monitoring unit at that site. The rectifier site metadata 114 include physical, environmental, and/or installation characteristics of each rectifier site and are absent voltage, current, or other electrical measurements from a rectifier.

Figure 7:
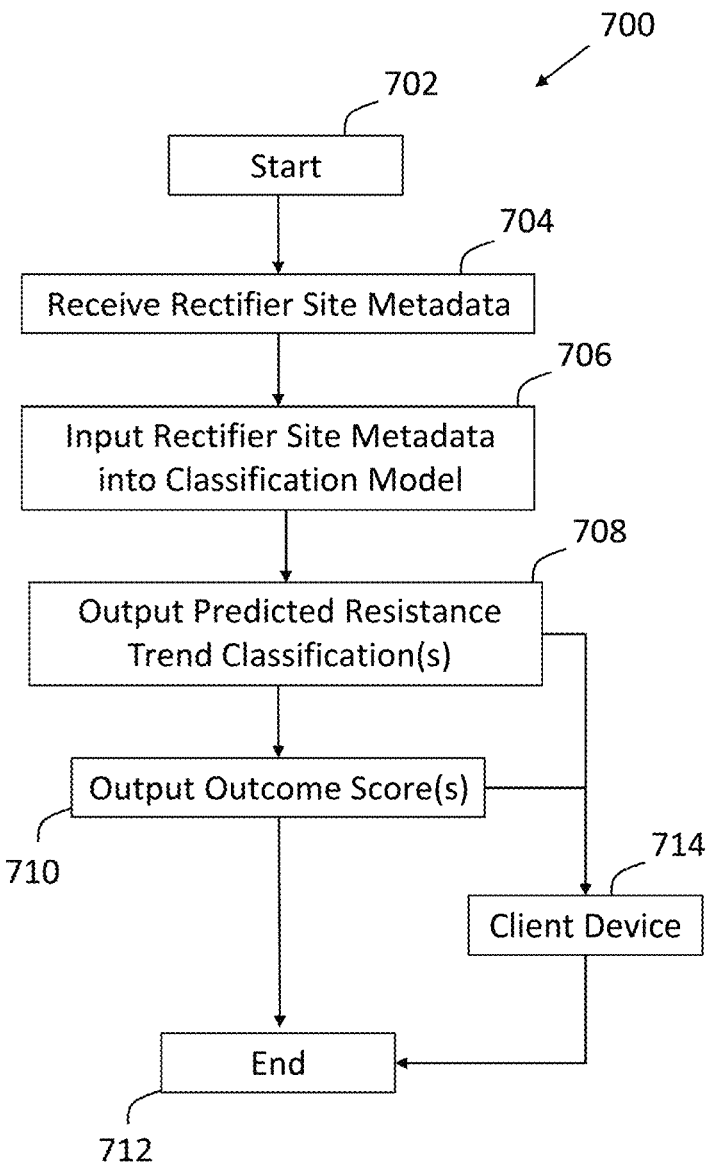
FIG. 7 is a flow diagram representing a method for predicting resistance trends at a rectifier site using a classification model trained in accordance with an aspect of the present invention.

FIG. 7 is a block diagram illustrating a method 700 for predicting resistance trend classification at a rectifier site 102. As discussed above, the model 116 is preferably stored on server 110. Accordingly, method 700 may be implemented by server 110 or one or more other computer systems suitable for executing model 116.

Method 700 is initiated at step 702. At step 704, rectifier site metadata 114 specific to a rectifier site 102 is received, for example, by server 110. At step 706, the rectifier site metadata 114 is input into the trained classification model 116. The classification model 116 is trained according to the methods described hereinabove. The trained classification model 116 generates as output a predicted resistance trend classification for the rectifier site 102 in response to rectifier site metadata input to the model, as shown at step 708. The predicted resistance trend classification may be, for example, one of an increasing resistance trend, a decreasing resistance trend and a steady resistance trend as shown, for example, in FIG. 5. At step 710, the trained classification model 116 outputs an outcome score indicating a likelihood that the predicted resistance trend classification is true.

In one embodiment, the predicted resistance trend classification is one of a plurality of predicted resistance trend classifications, the outcome score is one of a plurality of outcome scores, each associated with a corresponding one of the plurality of predicted resistance trend classifications and each indicating a likelihood that the associated one of the plurality of predicted resistance trend classifications is true. For example, an increasing resistance trend with an outcome score of 0.8 is more likely to occur than a decreasing resistance trend with an outcome score of 0.3.

Once the predicted resistance trend classification is generated and the outcome score generated, the method 700 may then end at step 712 or may first output one or both of the predicted resistance trend classifications and the outcome scores to a client device at step 714, which may be accessible by a user.

Using method 700, predictions of potential resistance trends and preferably the potential long-term resistance trends, at specific rectifier sites may be made without a rectifier being first installed at any rectifier site.

The features described can be implemented in digital electronic circuitry, or in computer hardware, firmware, software, or in combinations thereof. The apparatus can be implemented in a computer program product tangibly embodied in an information carrier, such as in a machine-readable storage device, for execution by a programmable processor, and method steps can be performed by a programmable processor executing a program of instructions to perform functions of the described implementations by operating on input data and generating output. The machine-readable storage device may be a non-transitory machine-readable storage device. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random-access memory or both. The elements of a computer are a processor for executing instructions and one or more memories for storing instructions and data. Generally, a computer will also include, or be operatively coupled to communicate with, one or more mass data storage devices for storing data files. Such devices may include magnetic disks, such as internal hard disks and removable disks, magneto-optical disks and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), or other monitor for displaying information to the user and a touchscreen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication such as a communication network. Examples of communication networks include, for example, a local-area network (LAN), a wide-area network (WAN) and computers and networks forming the Internet.

The computer system can include clients and servers. A client and server may be remote from each other and may interact through a network, such as the network described herein. The relationship of client and server arises by virtue of computer programs running on the respective computers and having a client-server relationship with each other.

While the invention has been described in terms of specific embodiments, it is apparent that other forms could be adopted by one skilled in the art. For example, the methods described herein could be performed in a manner which differs from the embodiments described herein. The steps of each method could be performed using similar steps or steps producing the same result, but which are not necessarily equivalent to the steps described herein. Some steps may also be performed in different order to obtain the same result. Similarly, the apparatuses and systems described herein could differ in appearance and construction from the embodiments described herein, the functions of each component of the apparatus could be performed by components of different construction but capable of a similar though not necessarily equivalent function, and appropriate materials could be substituted for those noted. Accordingly, it should be understood that the invention is not limited to the specific embodiments described herein. It should also be understood that the phraseology and terminology employed above are for the purpose of disclosing the illustrated embodiments, and do not necessarily serve as limitations to the scope of the invention.

What is claimed is:

1. A computer-implemented method for predicting long-term resistance trends at cathodic protection sites using site-specific metadata for preventive maintenance planning, comprising the steps of:

obtaining, by at least one computer, a plurality of historical resistance trends from a plurality of installed rectifier sites;

obtaining, by the at least one computer, a plurality of site-specific metadata features for the plurality of installed rectifier sites, wherein the site-specific metadata features are physical, environmental, and installation characteristics of each installed rectifier site of the plurality of installed rectifier sites and include at least soil characteristics, pipeline properties and environmental data, the site-specific metadata features being absent voltage, current, and resistance measurements at any rectifier site of the plurality of installed rectifier sites;

labelling each historical resistance trend of the plurality of historical resistance trends as one of a plurality of historic resistance trend classifications;

inputting into a machine learning algorithm the labelled historical resistance trends and the site-specific metadata features of the plurality of installed rectifier sites to train a classification model;

generating, by the classification model, a predicted resistance trend classification for a rectifier site in response to site-specific metadata features for the rectifier site being input into the classification model, and independent of voltage, current, and resistance measurements at any rectifier site of the plurality of installed rectifier sites; and scheduling preventive maintenance for the rectifier site using the predicted resistance trend classification.

2. The method of claim 1, wherein the site-specific metadata features further comprise anode spacing, rectifier installation date, pipe diameter, ground bed depth and soil resistivity measurements.

3. The method of claim 1, wherein the plurality of historic resistance trend classifications includes increasing resistance trend, decreasing resistance trend and steady resistance trend.

4. The method of claim 1, wherein the predicted resistance trend classification is one of an increasing resistance trend, a decreasing resistance trend and a steady resistance trend.

5. The method of claim 1, wherein the plurality of installed rectifier sites includes a first portion of available installed rectifier sites from which historical resistance trends are obtainable; and, the inputting step further includes inputting into the machine learning algorithm the historical resistance trends and the site-specific metadata features of the first portion of the installed rectifier sites to train the classification model.

6. The method of claim 5, further comprising the steps of:

inputting into the trained classification model the site-specific metadata features of a second portion of available installed rectifier sites to test predictive accuracy of the trained model.

7. The method of claim 1, wherein the site-specific metadata features include at least one of a weather event and a human intervention.

8. A system for predicting long-term resistance trends at cathodic protection sites using site-specific metadata for preventive maintenance planning, comprising:

at least one computer; and, at least one non-transitory computer-readable medium storing computer-readable instructions that, when executed by the at least one computer, cause the at least one computer:

obtain, a plurality of historical resistance trends from a plurality of installed rectifier sites;

obtain a plurality of site-specific metadata features for the plurality of installed rectifier sites, wherein the site-specific metadata features are physical, environmental, and installation characteristics of each installed rectifier site of the plurality of installed rectifier sites and include at least soil characteristics, pipeline properties, and environmental data, the site-specific metadata features being absent voltage, current, and resistance measurements at any rectifier site of the plurality of installed rectifier sites;

label each historical resistance trend of the plurality of historical resistance trends as one of a plurality of historic resistance trend classifications;

input, into a machine learning algorithm, the labelled historical resistance trends and the site-specific metadata features of the plurality of installed rectifier sites to train a classification model;

generate, by the classification model, a predicted resistance trend classification for a rectifier site in response to the site-specific metadata features for a rectifier site being input into the classification model, and independent of voltage, current, and resistance measurements at any rectifier site of the plurality of installed rectifier sites; and schedule predictive maintenance for the rectifier site based on the predicted resistance trend classification.

9. The system of claim 8, wherein the site-specific metadata features further comprise anode spacing, rectifier installation date, pipe diameter, ground bed depth and soil resistivity measurements.

10. The system of claim 8, wherein the plurality of historic resistance trend classifications includes increasing resistance trend, decreasing resistance trend and steady resistance trend.

11. The system of claim 8, wherein the predicted resistance trend classification is one of an increasing resistance trend, a decreasing resistance trend and a steady resistance trend.

12. The system of claim 8, wherein the plurality of installed rectifier sites includes a first portion of available installed rectifier sites from which historical resistance trends are obtainable; and, the inputting step further includes inputting into the machine learning algorithm the historical resistance trends and the site-specific metadata features of the first portion of the installed rectifier sites to train the classification model.

13. The system of claim 12, further comprising the steps of:

inputting into the trained classification model the site-specific metadata features of a second portion of available installed rectifier sites to test predictive accuracy of the trained model.

14. The system of claim 8 wherein the site-specific metadata features include at least one of a weather event and a human intervention.

15. At least one non-transitory computer-readable media storing computer-readable instructions that, when executed by at least one computer, cause the at least one computer to predict rectifier resistance trends comprising:

obtaining, by at least one computer, a plurality of historical resistance trends from a plurality of installed rectifier sites;

obtaining, by the at least one computer, site-specific metadata features for the plurality of installed rectifier sites, wherein the site-specific metadata features are physical, environmental, and installation characteristics of each installed rectifier site of the plurality of installed rectifier sites and include at least soil characteristics, pipeline properties, and environmental data, the site-specific metadata features being absent voltage, current, and resistance measurements at any rectifier site of the plurality of installed rectifier sites;

labelling each historical resistance trend of the plurality of historical resistance trends as one of a plurality of historic resistance trend classifications;

inputting into a machine learning algorithm the historical resistance trends and the site-specific metadata features of the plurality of installed rectifier sites to train a classification model;

generating, by the classification model, a predicted resistance trend classification for a rectifier site in response to site-specific metadata for the rectifier site being input into the classification model, and independent of voltage, current, and resistance measurements at any rectifier site of the plurality of installed rectifier sites; and scheduling preventive maintenance for the rectifier site using the predicted resistance trend classification.

16. The at least one non-transitory computer-readable media of claim 15, wherein the preventive maintenance includes at least one of anode replacement, ground bed renewal or pipeline coating repairs.

17. The at least one non-transitory computer-readable media of claim 15, wherein the plurality of historic resistance trend classifications includes increasing resistance trend, decreasing resistance trend and steady resistance trend.

18. The at least one non-transitory computer-readable media of claim 15, wherein the predicted resistance trend classification is one of an increasing resistance trend, a decreasing resistance trend and a steady resistance trend.

19. The at least one non-transitory computer-readable media of claim 15, wherein the plurality of installed rectifier sites includes a first portion of available installed rectifier sites from which historical resistance trends are obtainable; and, the inputting step further includes inputting into the machine learning algorithm the historical resistance trends and the site-specific metadata features of the first portion of the installed rectifier sites to train the classification model.

20. The at least one non-transitory computer-readable media of claim 19, wherein the instructions further comprise:

inputting into the trained classification model the site-specific metadata features of a second portion of available installed rectifier sites to test predictive accuracy of the trained model.

21. The at least one non-transitory computer-readable media of claim 15, wherein the rectifier site-specific metadata features further comprise anode spacing, rectifier installation date, pipe diameter, ground bed depth and soil resistivity measurements.

22. A computer-implemented method of predicting rectifier site resistance trends comprising the steps of:

receiving, by at least one computer, rectifier site metadata features specific to a rectifier site, wherein the rectifier site metadata features are physical, environmental, and installation characteristics of each installed rectifier site of the plurality of installed rectifier sites and include at least soil characteristics, pipeline properties, and environmental data, the rectifier site metadata features being absent voltage, current, and resistance measurements at any rectifier site of the plurality of installed rectifier sites; and, generating, by the at least one computer, a predicted resistance trend classification for the rectifier site by inputting the rectifier site metadata into a classification model trained to:

receive, as input, the rectifier site metadata, independent of voltage, current, and resistance measurements at the rectifier site, and output a predicted resistance trend classification for the rectifier site based on the received rectifier site metadata; and scheduling preventive maintenance for the rectifier site using the predicted resistance trend classification.

23. The method according to claim 22 further comprising:

generating, by the at least one computer, an outcome score indicating a likelihood that the predicted resistance trend classifications are true.

24. The method according to claim 23, wherein the predicted resistance trend classification is one of a plurality of predicted resistance trend classifications, the outcome score is one of a plurality of outcome scores, each associated with a corresponding one of the plurality of predicted resistance trend classifications and each indicating a likelihood that an associated one of the plurality of predicted resistance trend classifications is true.

25. The method according to claim 22, wherein the predicted resistance trend classification is further used for at least one of planning installation of a rectifier at the rectifier site, planning installation of at least one anode at the rectifier site, planning installation of a ground bed at the rectifier site, planning replacement of a ground bed at the rectifier site or planning maintenance at the rectifier site.

\* \* \* \* \*